US009880455B2

(12) United States Patent
Kase et al.

(10) Patent No.: US 9,880,455 B2
(45) Date of Patent: Jan. 30, 2018

(54) LIGHT SOURCE UNIT HAVING A CASE FOR FIXING OPTICAL MEMBERS THEREIN

(71) Applicant: CASIO COMPUTER CO., LTD., Tokyo (JP)

(72) Inventors: Toshifumi Kase, Tokyo (JP); Naoto Yoshida, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/392,781

(22) Filed: Dec. 28, 2016

(65) Prior Publication Data

US 2017/0248838 A1    Aug. 31, 2017

(30) Foreign Application Priority Data

Feb. 25, 2016  (JP) ................. 2016-034163

(51) Int. Cl.
*G03B 21/14*   (2006.01)
*G03B 21/20*   (2006.01)

(52) U.S. Cl.
CPC ....... *G03B 21/2093* (2013.01); *G03B 21/145* (2013.01); *G03B 21/2066* (2013.01)

(58) Field of Classification Search
CPC ........ G03B 21/00; G03B 21/02; G03B 21/14; G03B 21/53
See application file for complete search history.

(56) References Cited

U.S. PATENT DOCUMENTS

2006/0192926 A1* 8/2006 Soper ............... G03B 21/006
                                                          353/119
2013/0314677 A1* 11/2013 Rodriguez, Jr. ....... G03B 17/54
                                                          353/119

FOREIGN PATENT DOCUMENTS

JP    2003-287815 A    10/2003
JP    2013-97233 A     5/2013

* cited by examiner

*Primary Examiner* — Sultan Chowdhury
*Assistant Examiner* — Danell L Owens
(74) *Attorney, Agent, or Firm* — Fitch Even Tabin & Flannery LLP

(57) ABSTRACT

There is provided a light source unit including a light source case into which a plurality of optical members are incorporated, wherein the light source case has fixing portions for fixing the optical member which are provided in a position on a main body bottom plate of the light source case and in both side positions of the optical member above the main body bottom plate, and an upper fastening plate which presses down the optical member accommodated in the light source case, and wherein the fixing portions include a lower fixing portion where a primary positioning portion is formed on the main body bottom plate and side fixing portions where a pair of secondary positioning portions are formed which are brought into abutment with a surface of the optical member which is opposite to a surface thereof which is brought into abutment with the primary positioning portion.

10 Claims, 12 Drawing Sheets

LIGHT SOURCE UNIT HAVING A CASE FOR FIXING OPTICAL MEMBERS THEREIN

CROSS-REFERENCE TO RELATED APPLICATION

This application is based upon and claims the benefit of priority under 35 USC 119 from Japanese Patent Application No. 2016-034163 filed on Feb. 25, 2016, the entire disclosure of which, including the specification, claims, drawings and abstract, is incorporated herein by reference.

BACKGROUND OF THE INVENTION

Field of the Invention

The present invention relates to a light source unit and a projector including this light source unit.

Description of the Related Art

In these days, data projectors are used on many occasions as an image projection system which projects a screen of a personal computer and a video image, as well as images based on image data which is stored on a memory card on to a screen. These projectors are such that light emitted from a light source is collected on to a micromirror display device which is called a DMD (Digital Micromirror Device) or a liquid crystal panel so that a collar image is displayed on the screen.

In recent years, for those projectors, there have been developed and proposed various light source units which use a plurality of semiconductor light emitting devices such as laser diodes as a light source and which include a plurality of optical members such as lenses and mirrors in association with the use of such semiconductor light emitting devices.

For example, a light source unit is proposed which includes an excitation light source which emits light in a range of blue wavelengths by the use of a laser diode and an optical wheel (a rotary plate) which has a luminescent material layer which absorbs light emitted from the excitation light source to convert it into visible light and which is driven to rotate by a motor, and a projector including this light source is proposed.

Then, as disclosed in Japanese Unexamined Patent Application No. 2013-097233 (JP-A-2013-097233), the applicant of this patent application has proposed and implemented the projector including the excitation light shining device having the blue laser diodes. This projector includes the light source unit in which excitation light from the excitation light shining device is shone on to the rotating luminescent wheel, light in the range of green wavelength range is emitted from the luminescent material layer of the luminescent wheel, the diffuse transmission portion is formed on part of the luminescent wheel so that the excitation light which is light in the range of blue wavelengths is transmitted therethrough, and light in the range of red wavelengths which is emitted from the light emitting diode is combined with the light in the range of green wavelengths and the light in the range of blue wavelengths so as to be emitted altogether in the same direction.

Additionally, as represented by the projector disclosed in Japanese Unexamined Patent Application No. 2003-287815 (JP-A-2003-287815), the projector has been disclosed and proposed in which light source light of the high-pressure discharge lamp which emits white light is separated into red light, green light and blue light by the dichroic mirror, the red light, the green light and the blue light are made into the three primary image lights by the liquid crystal panel which is the optical modulator, and thereafter, the three primary image lights are combined together by the dichroic prism for projection.

As described above, in the projector, many lenses and mirrors are used in the optical systems including the light source unit which are incorporated in the projector. In order to enhance the brightness of a projected image and the color repeatability, the optical members such as lenses and mirrors are assembled together with great care so as not only to dispose the lenses in the predetermined positions but also to set the center axes (optical axes) of the lenses in the predetermined positions.

In addition, as described above, in the optical systems of the projector, although the lenses and mirrors are assembled together while installing them in the predetermined positions with high accuracy, it is difficult to fix the lenses and mirrors in the predetermined positions with high accuracy due to the finishing tolerances of the lenses and mirrors themselves and the production tolerances of the constituent parts into which the lenses and mirrors are incorporated. However, the highly accurate mounting is attempted to be realized through the secondary cutting or by using the secondary fixing parts in part of the assembling work, and this requires a lot of trouble and a large number of labor hours.

SUMMARY OF THE INVENTION

The invention has been made in view of these situations and an object thereof is to provide a light source unit and a projector in which lenses can be fixed in positions with high accuracy while making the assembling work thereof simple and easy.

According to an aspect of the invention, there is provided a light source unit including a light source case into which a plurality of optical members are incorporated, wherein the light source case has:

fixing portions for fixing the optical member which are provided in a position on a main body bottom plate of the light source case and in both side positions of the optical member above the main body bottom plate; and an upper fastening plate which presses down the optical member which is accommodated in the light source case, and wherein the fixing portions include a lower fixing portion where a primary positioning portion is formed on the main body bottom plate and side fixing portions where a pair of secondary positioning portions are formed which are brought into abutment with a surface of the optical member which is opposite to a surface thereof which is brought into abutment with the primary positioning portion.

DETAILED DESCRIPTION OF THE PREFERRED EMBODIMENT

Figure 1:
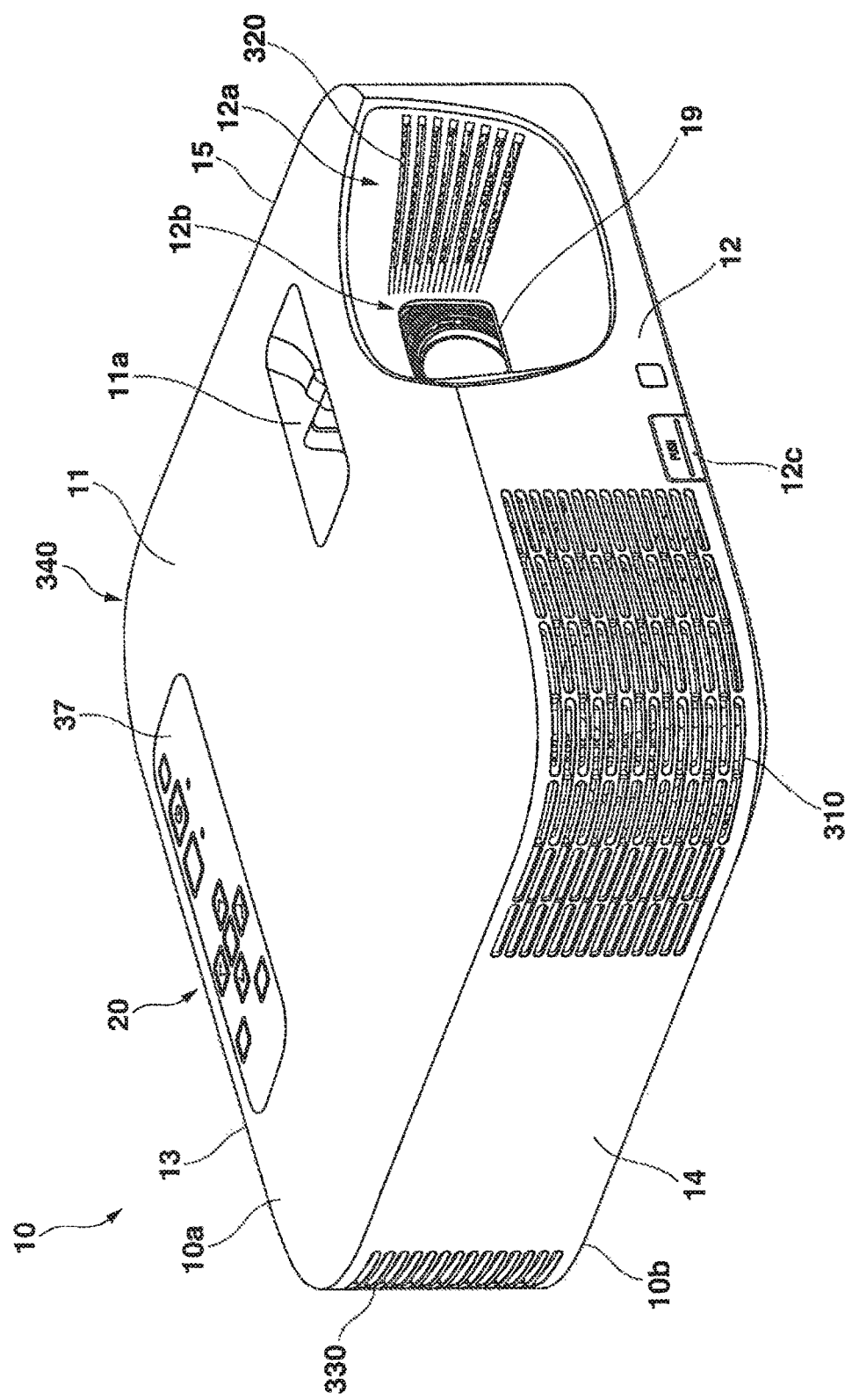
FIG. 1 is an external perspective view of a projector according to an embodiment of the invention.

Hereinafter, a mode for carrying out the invention will be described. FIG. 1 is an external perspective view of a projector 10. The projector 10 of this embodiment includes an upper main body case 10a and a lower main body case 10b. A front panel 12, a back panel 13, a right panel 14 and a left panel 15, which are side panels of a casing of the projector 10, are provided so as to extend downwards from an outer circumferential edge of the upper main body case 10a. Lower ends of the panels 12 to 15 are in abutment with an outer circumferential edge of the lower main body case 10b. Consequently, the projector 10 is formed into a substantially rectangular parallelepiped shape by the upper main body case 10a and the lower main body case 10b. In this embodiment, when referred to in relation to the direction of the projector 10, left and right denote, respectively, left and right in relation to the projecting direction of the projector 10, and front and rear denote, respectively, front and rear in relation to the direction of a screen as viewed from the projector 10 and a traveling direction of a pencil of light.

Figure 4:
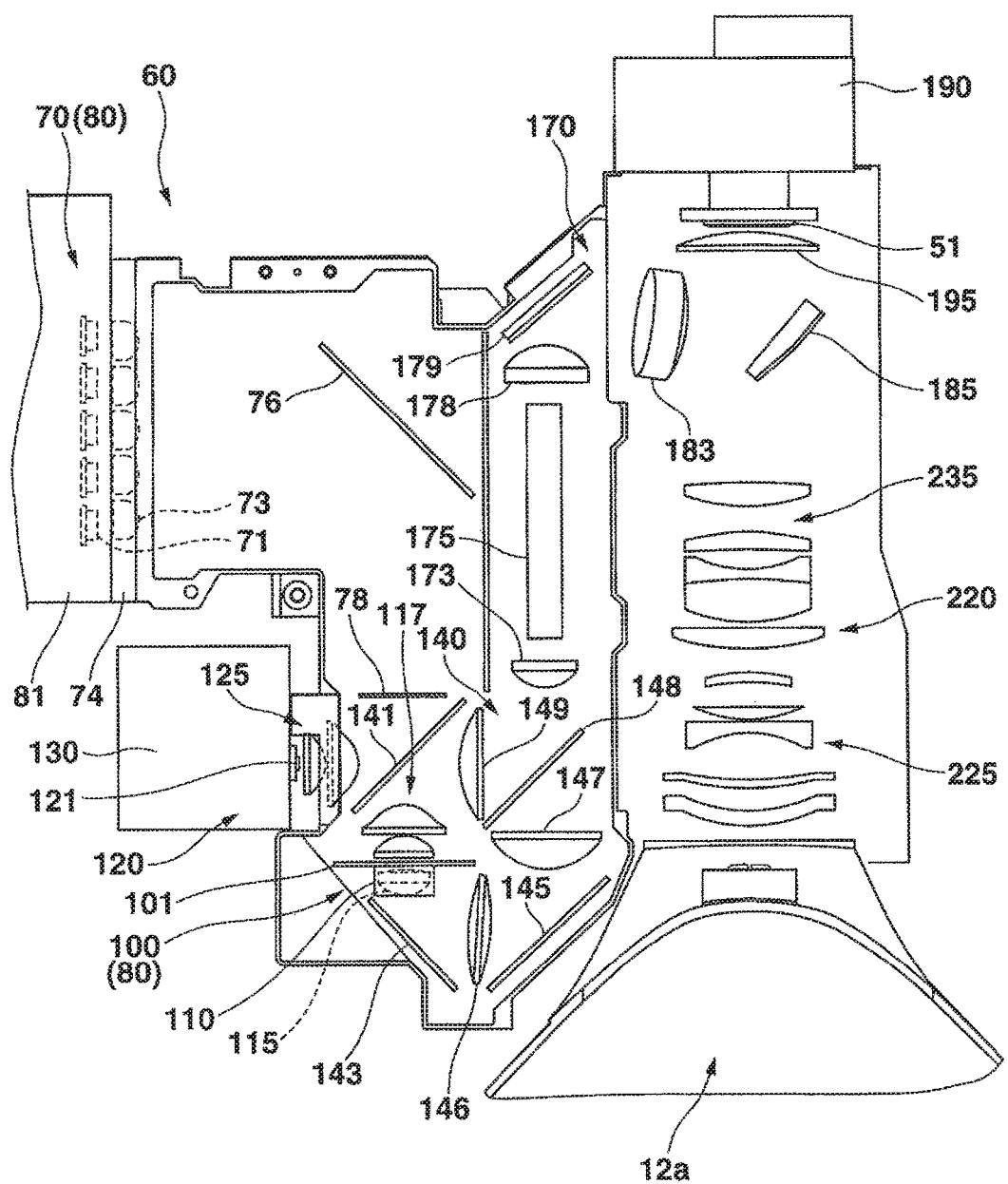
FIG. 4 is a schematic plan view of a light source unit according to the embodiment of the invention.

A keys/indicators unit 37 and a projected image adjusting unit 11a are provided on an upper panel 11 of the casing of the projector 10. Disposed on this keys/indicators unit 37 are keys and indicators that include a power supply switch key, a power indicator, a projection switch key, and an overheat indicator. The power indicator informs whether a power supply is on or off. The projection switch key switches on or off the projection by the projector 10. The overheat indicator informs of an overheat condition occurring in a light source unit, a display device, or a control circuit when they really overheat. The projected image adjusting unit 11a includes one or a plurality of rotary knobs. Then, the position of a movable lens of a projection side optical system, which will be described later in FIG. 4, is adjusted by operating the rotary knob, so that the size and focus of a projected image are adjusted. Although not shown, the projector 10 includes an IR reception unit which receives a control signal from a remote controller.

Outside air inlet holes 310 are provided at a corner portion formed by a front end of the right panel 14 and a right end of the front panel 12. A light emitting portion 12a is provided at a left end portion of the front panel 12 in such a way as to be depressed into the curved shape of a mortar. Outside air inlet holes 320 are formed in an inner wall of the light emitting portion 12a which corresponds to the left panel 15. In other words, the outside air inlet holes 320 are provided at a front left corner portion of the front panel 12. The projector 10 has a projection part 12b and a lens cover 19 which covers the projection port 12b at the light emitting portion 12a.

A height adjusting button 12c is provided at the lower end of the front panel 12. The projector 10 includes a support leg which is provided at a side of an interior portion thereof which corresponds to the front panel 12. In the projector 10, the support leg is allowed to emerge from a lower side of the projector 10 or retreat into the projector 10 from the lower side thereof while the height adjusting button 12c is kept depressed. Thus, the user can adjust the height or gradient of the projector 10 by operating the height adjusting button 12c so as to fix the support leg which is caused to emerge from the lower side of the projector 10 by an arbitrary amount.

Provided on the back panel 13 are an input/output connector unit where USB terminals, a video signal input D-SUB terminal into which a video signal is inputted, an S terminal, and an RCA terminal are provided and various types of terminals 20 including a power supply adaptor plug. Additionally, inside air outlet holes 330 are formed in a corner portion formed by the back panel 13 and the right panel 14, and inside air outlet holes 340 are formed in a corner portion formed by the back panel 13 and the left panel 15. In other words, the inside air outlet holes 330 are disposed at the rear right corner portion and the inside air outlet holes 340 are disposed at the rear left corner portion of the projector 10.

Figure 2:
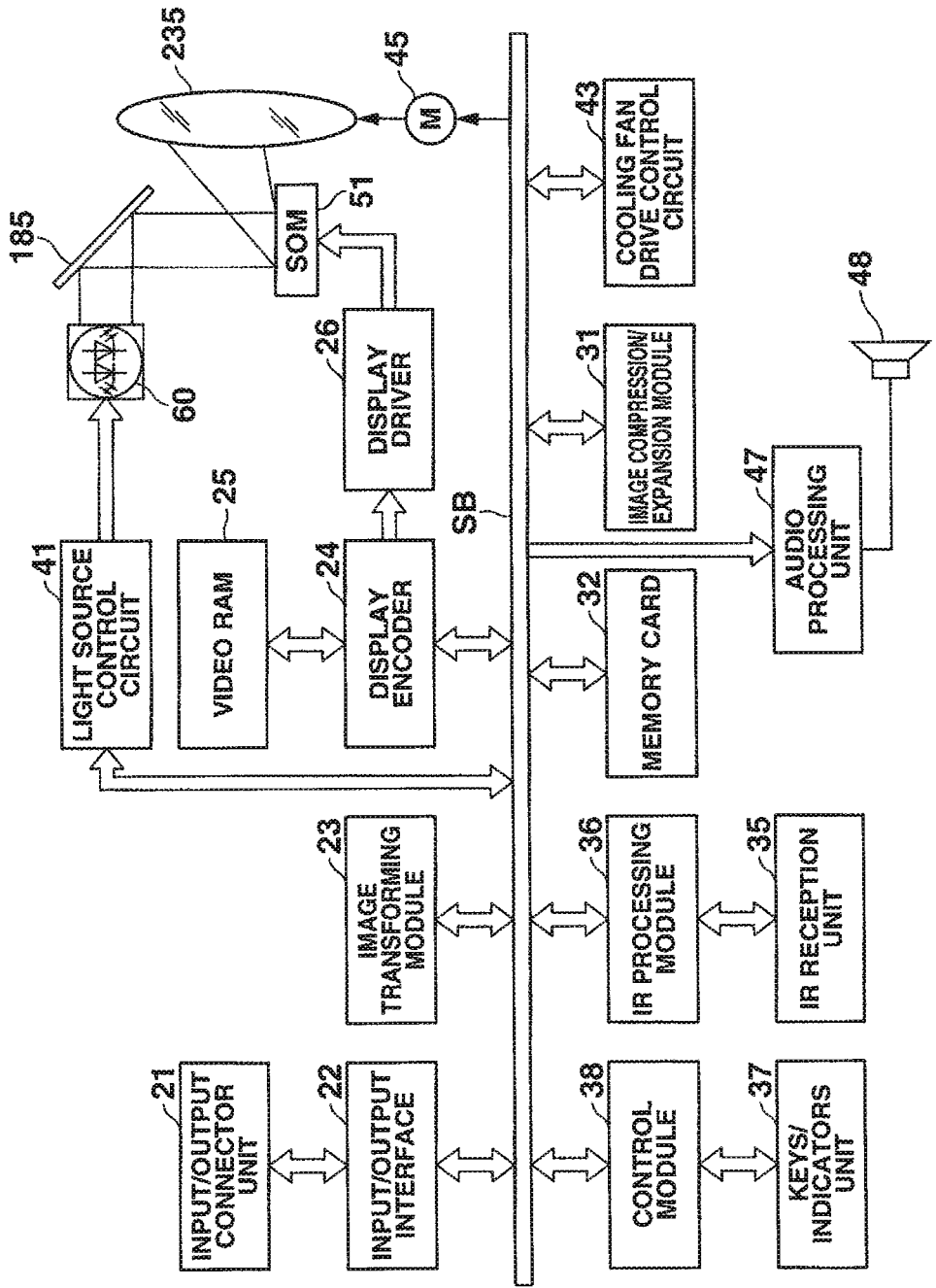
FIG. 2 is a functional block diagram of the projector according to the embodiment of the invention.

Next, a projector control unit of the projector 10 will be described by the use of a functional block diagram shown in FIG. 2. The projection control unit includes a control module 38, an input/output interface 22, an image transforming module 23, a display encoder 24 and a display driver 26.

This control module 38 governs the control of respective operations of circuitries within the projector 10 and is made up of a CPU, a ROM which stores in a fixed fashion operation programs of various types of settings and a RAM which is used as a working memory.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals inputted thereinto on a video RAM 25 for storage therein and generates a video signal from the contents stored in the video RAM 25, outputting the video signal so generated to the display driver 26.

The display driver 26 functions as a display device control device and drives a display device 51, which is a spatial optical modulator (SOM), at an appropriate frame rate which corresponds to the image signal outputted from the display encoder 24.

In this projector 10, a pencil of light which is emitted from a light source unit 60 is shone onto the display device 51 via a light guiding optical system, which will be described later, whereby an optical image (an image) is formed by using reflected light that is reflected by the display device 51. Then, in the projector 10, the optical image so formed is projected on to a screen via a projection side optical system, which will also be described later, whereby the image is displayed on the screen. In addition, a movable lens group 235 of the projection side optical system is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium.

When in a reproducing mode, the image compression/expansion module 31 performs the following operations. Specifically, the image compression/expansion module 31 reads out image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images based on the image data stored on the memory card 32.

Operation signals which are generated at the keys/indicators unit 37 which includes the main keys and indicators which are provided on the upper panel 11 of the casing are sent out directly to the control module 38. Key operated signals from the remote controller are received by the IR reception unit 35, and a code signal demodulated at an IR processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 so as to output loudly sound or voice based on the audio data.

The control module 38 controls a light source control circuit 41 which is configured as a light source control unit. This light source control circuit 41 controls individually the emission of light from an excitation light shining device of a green light source device and a red light source of the light source unit 60 so that specified ranges of wavelengths of light which are required in producing an image are emitted from the light source unit 60. Light in the predetermined ranges of wavelengths emitted from the light source unit 60 is then reflected on a shining mirror 185 to be shone on to the display device 51.

The control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating even after the power supply to a projector main body of the projector 10 is switched off by use of a timer. Alternatively, the control module 38 determines on a timing at which the power supply to the projector main body of the projector 10 is cut off depending upon the results of the temperature detections by the temperature sensors.

Figure 3:
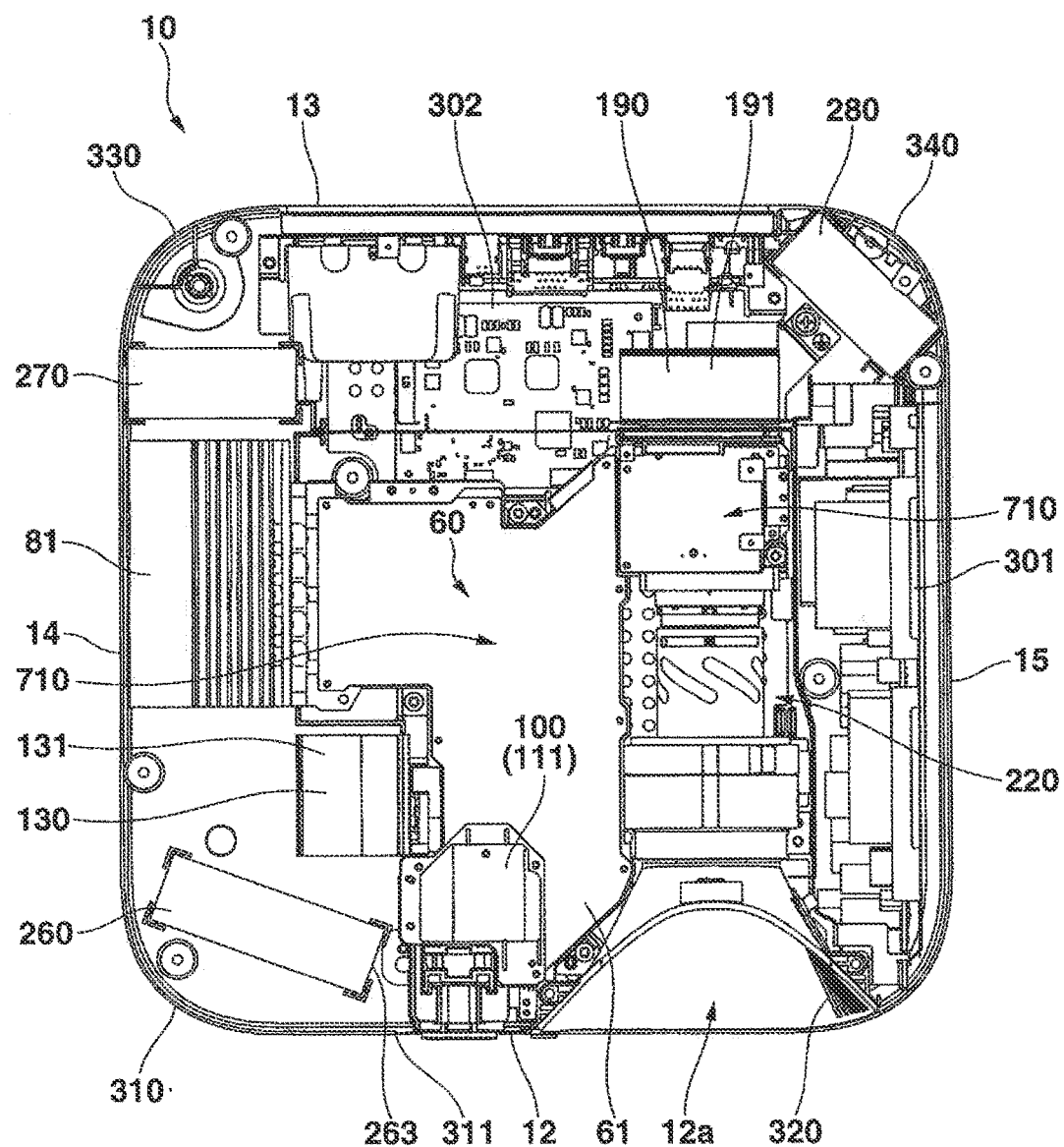
FIG. 3 is a schematic plan view showing an internal construction of the projector according to the embodiment of the invention.

Next, an internal construction of the projector 10 will be described. FIG. 3 is a schematic plan view showing the internal construction of the projector 10. The projector 10 includes a power supply device 301, a control circuit board 302, and the light source unit 60. Additionally, the projector 10 includes an outside air inlet fan 260, a middle fan 270 and an inside air outlet fan 280 as cooling fans.

The light source unit 60 is disposed substantially at the center of the casing of the projector 10. The light source unit 60 accommodates optical members such as lenses and mirrors in an interior thereof by using a light source case 61. The power supply device 301 is disposed on a side of the light source unit 60 which faces the left panel 15. A substrate of the power supply device 301 is disposed substantially parallel to the left panel 15. The control circuit board 302 is disposed on a side of the light source unit 60 which faces the back panel 13. The control circuit board 302 is disposed substantially at right angles to an up-to-down or vertical direction. The control circuit board 302 includes a power supply circuitry block, a light source control block and the like. Additionally, a plurality of control circuit boards 302 can be provided individually for functions of the power supply block, light source control block and the like.

An internal construction of the light source 60 will be described. FIG. 4 is a schematic plan view of the light source unit 60. The light source unit 60 includes a red light source device 120 which is a light source of light in a range of red wavelengths, a green light source device 80 which is a light source of light in a range of green wavelength and an excitation light shining device 70 which functions not only as a blue light source device which is a light source of light in a range of blue wavelengths but also as an excitation light source. The green light source device 80 is made up of the excitation light shining device 70 and a luminescent plate device 100. The light source unit 60 has a light guiding optical system 140. The light guiding optical system 140 combines together a pencil of light in the range of green wavelengths, a pencil of light in the range of blue wavelengths and a pencil of light in the range of red wavelengths and guides the pencils of light in the green, blue and red wavelength ranges on to the same optical path.

As shown in FIG. 3, the excitation light shining device 70 is disposed on a side of the casing of the projector 10 which faces the right panel 14. The excitation light shining device 70 includes a plurality of solid light emitting devices which are disposed so that their optical axes become parallel to the back panel 13. The solid light emitting devices of this embodiment are blue laser diodes 71 which emit light in the range of blue wavelengths. Additionally, the blue laser diodes 71 are disposed parallel to the right panel 14. These blue laser diodes 71 are fixed to a fixing holder 74.

As shown in FIG. 4, the excitation light shining device 70 includes a reflecting mirror 76, a diffuser plate 78 and a heat sink 81. The reflecting mirror 76 changes the direction of axes of light rays emitted from the blue laser diodes 71 through 90 degrees towards the diffuser plate 78. The diffuser plate 78 diffuses the light emitted from the blue laser diodes 71 and reflected on the reflecting mirror 76 at a predetermined diffusing angle. The heat sink 81 is disposed between the blue laser diodes 71 and the right panel 14. As shown in FIG. 3, surfaces of first fins which are formed on a right-hand side of the heat sink 81 are formed normal to the vertical direction. Additionally, surfaces of second fins which are formed on the heat sink 81 are formed normal to a left-to-right or transverse direction.

Returning to FIG. 4, collimator lenses 73 are disposed individually on optical paths of the individual blue laser diodes 71, and these collimator lenses 73 enhance the directivity of light emitted from the corresponding blue laser diodes 71 to thereby convert the light into parallel beams. These collimator lenses 73 are fixed to the fixing holder 74 together with the blue laser diodes 71.

The red light source device 120 includes a red light source 121 which is disposed so that an optical axis thereof is parallel to pencils of light from the blue laser diodes 71 and a collective lens group 125 which collects light emitted from the red light source 121. This red light source 121 is a red light emitting diode which is a solid light emitting device which emits light in the range of red wavelengths. The red light source device 120 is disposed so that an axis of light in the red wavelength range which is emitted from the red light source device 120 intersects an axis of light in the green wavelength range which is emitted from a luminescent plate 101.

Additionally, the red light source device 120 includes a heat sink 130 which is disposed on a side of the red light source 121 which faces the right panel 14. Fins 131 of the heat sink 130 are provided so as to extend to the right as a whole and are formed substantially normal to the vertical direction. When seen from the front, the fins are formed inclined so as to expand radially in the vertical direction. The heat sink 130 is disposed in a position where the heat sink 130 does not overlap the heat sink 81 for the laser diodes 71 in the vertical and transverse directions when seen from the front.

The luminescent plate device 100 which makes up the green light source device 80 includes the luminescent plate 101, a motor 110, a collective lens group 117 which lies on an incident or entrance side and a collective lens 115 which lies on an exit side. The luminescent plate 101 is a luminescent wheel which is disposed so as to be at right angles to an axis of light emitted from the excitation light shining device 70. This luminescent plate 101 is driven to rotate by the motor 110. The collective lens group 117 collects pencils of excitation light emitted from the excitation light shining device 70 to the luminescent plate 101. The collective lens 115 collects pencils of light emitted from the luminescent plate 101 in the direction of the front panel 12.

The luminescent plate device 100 is disposed above the collective lens group 117 and the collective lens 115. Because of this, part of a lower portion of the luminescent plate 101 is disposed on optical paths of the collective lens group 117 and the collective lens 115.

A luminous light emitting area and a diffuse transmission area are provided end to end in a circumferential direction on the luminescent plate 101. The luminous light emitting area receives light in the range of blue wavelengths emitted from the blue laser diodes 71 as excitation light and emits excited luminous light in the range of green wavelengths. The diffuse transmission area transmits light emitted from the blue laser diodes 71 while diffusing the same. The light so transmitted while being diffused is emitted as light in the range of blue wavelengths of the light source unit 60.

The light guiding optical system 140 has a first dichroic mirror 141, a collective lens 149, a second dichroic mirror 148, a first reflecting mirror 143, a collective lens 146, a second reflecting mirror 145, and a collective lens 147. The first dichroic mirror 141 is disposed in a position where light in the range of blue wavelengths emitted from the excitation light shining device 70 and light in the range of green wavelength range emitted from the luminescent plate 101 intersect light in the range of red wavelengths emitted from the red light source device 120.

The first dichroic mirror 141 transmits light in the range of blue wavelengths and light in the range of red wavelengths and reflects light in the range of green wavelengths. The direction of an axis of the light in the range of green wavelengths which is reflected on the first dichroic mirror 141 is changed through 90 degrees towards the collective lens 149 in the direction of the left panel 15. Consequently, the axis of light in the range of red wavelengths which is transmitted through the first dichroic mirror 141 coincides with the axis of the light which is reflected on the first dichroic mirror 141.

The collective lens 149 is disposed on aside of the first dichroic mirror 141 which faces the left panel 15. The light in the red wavelength range which passes through the first dichroic mirror 141 and the light in the green wavelength range which is reflected by the first dichroic mirror 141 are both incident on the collective lens 149.

The second dichroic mirror 148 is disposed on a side of the collective lens 149 which faces the left panel 15 and on a side of the collective lens 147 which faces the back panel 13. The second dichroic mirror 148 reflects light in the red wavelength range and light in the green wavelength range and transmits light in the blue wavelength range. Consequently, the light in the red wavelength range and the light in the green wavelength range which are collected by the collective lens 149 are reflected by the second dichroic mirror 148 so that the directions of the axes thereof are changed through 90 degrees towards the back panel 13. A collective lens 173 of a light source side optical system 170 is disposed on a side of the second dichroic mirror 148 which faces the back panel 13. The light in the red wavelength range and the light in the green wavelength range which are reflected by the second dichroic mirror 148 are incident on the collective lens 173.

The first reflecting mirror 143 is disposed on the axis of the light in the blue wavelength which is transmitted through the luminescent plate 101, that is, between the collective lens 115 and the front panel 12. The first reflecting mirror 143 reflects the light in the blue wavelength range and changes the direction of the axis of the light in the blue wavelength range through 90 degrees in the direction of the left panel 15. The collective lens 146 is disposed on a side of the first reflecting mirror 143 which faces the left panel 15. In addition, the second reflecting mirror 145 is disposed on a side of the collective lens 146 which faces the left panel 15. The second reflecting mirror 145 changes the direction of the axis of the light in the blue wavelength range which is reflected by the first reflecting mirror 143 and is then collected by the collective lens 146 through 90 degrees towards the back panel 13.

The collective lens 147 is disposed on a side of the second reflecting mirror 145 which faces the back panel 13. The light in the blue wavelength range which is reflected by the second reflecting mirror 145 passes through the second dichroic mirror 148 by way of the collective lens 147 and is then incident on the collective lens 173 of the light source side optical system 170. In this way, the pencils of light in the red, green and blue wavelength ranges which are guided by the light guiding optical system 140 are guided on to the same optical path of the light source side optical system 170.

The light source side optical system 170 includes the collective lens 173, a light tunnel 175, a collective lens 178, a light axis changing mirror 179, a collective lens 183, a shining mirror 185, and a condenser lens 195. Since the condenser lens 195 emits image light which is emitted from the display device 51 which is disposed on a side of the condenser lens 195 which faces the back panel 13 towards a projection side optical system 220, the condenser lens 195 is also part of the projection side optical system 220.

The pencils of light in the red, green and blue wavelength ranges which are emitted from the collective lens 173 are incident on the light tunnel 175. The pencils of red, green and blue light which are incident on the light tunnel 175 are made into pencils of red, green and blue light whose intensities are uniformly distributed by the light tunnel 175.

The light axis changing mirror 179 is disposed on an optical axis of the light tunnel 175 on a side thereof which faces the back panel 13 via the collective lens 178. The pencils of red, green and blue light which exit from an exit port of the light tunnel 175 are collected by the collective lens 178, and the directions of axes thereof are then changed so that the pencils of red, green and blue light are directed towards the collective lens 183.

The pencils of red, green and blue light which are reflected by the light axis changing mirror 179 are collected by the collective lens 183 and are then shone on to the display device 51 at a predetermined angle via the condenser lens 195 by the shining mirror 185. A heat sink 190 is provided on a side of the display device 51 which faces the back panel 13. The display device 51 which is a digital micromirror device (DMD) is cooled by this heat sink 190. Surfaces of fins formed at the rear of the heat sink 190 are formed normal to the vertical direction.

The pencils of red, green and blue light, which are the light source light which is shone on to an image forming surface of the display device 51 by the light source side optical system 170, are reflected on the image forming surface of the display device 51 and is then projected on to a screen via the projection side optical system 220 as projected light.

The projection side optical system 220 includes the condenser lens 195, the movable lens group 235, and a fixed lens group 225. The fixed lens group 225 is incorporated in a fixed lens barrel. The movable lens group 235 is incorporated in a movable lens barrel and is moved manually or automatically for zooming and focusing.

By configuring the projector 10 in the way described heretofore, when the luminescent plate 101 is rotated and light is emitted from the excitation light shining device 70 and the red light source device 120 at different timings, light in the red wavelength range, light in the green wavelength range and light in the blue wavelength range are incident on the light tunnel 175 by way of the light guiding optical system 140 and are then incident on the display device 51 by way of the light source side optical system 170. Thus, the DMD, which is the display device 51 of the projector 10, displays red light, green light and blue light in a time-sharing fashion according to the data, thereby making it possible to project a color image on to the screen.

Figure 5:
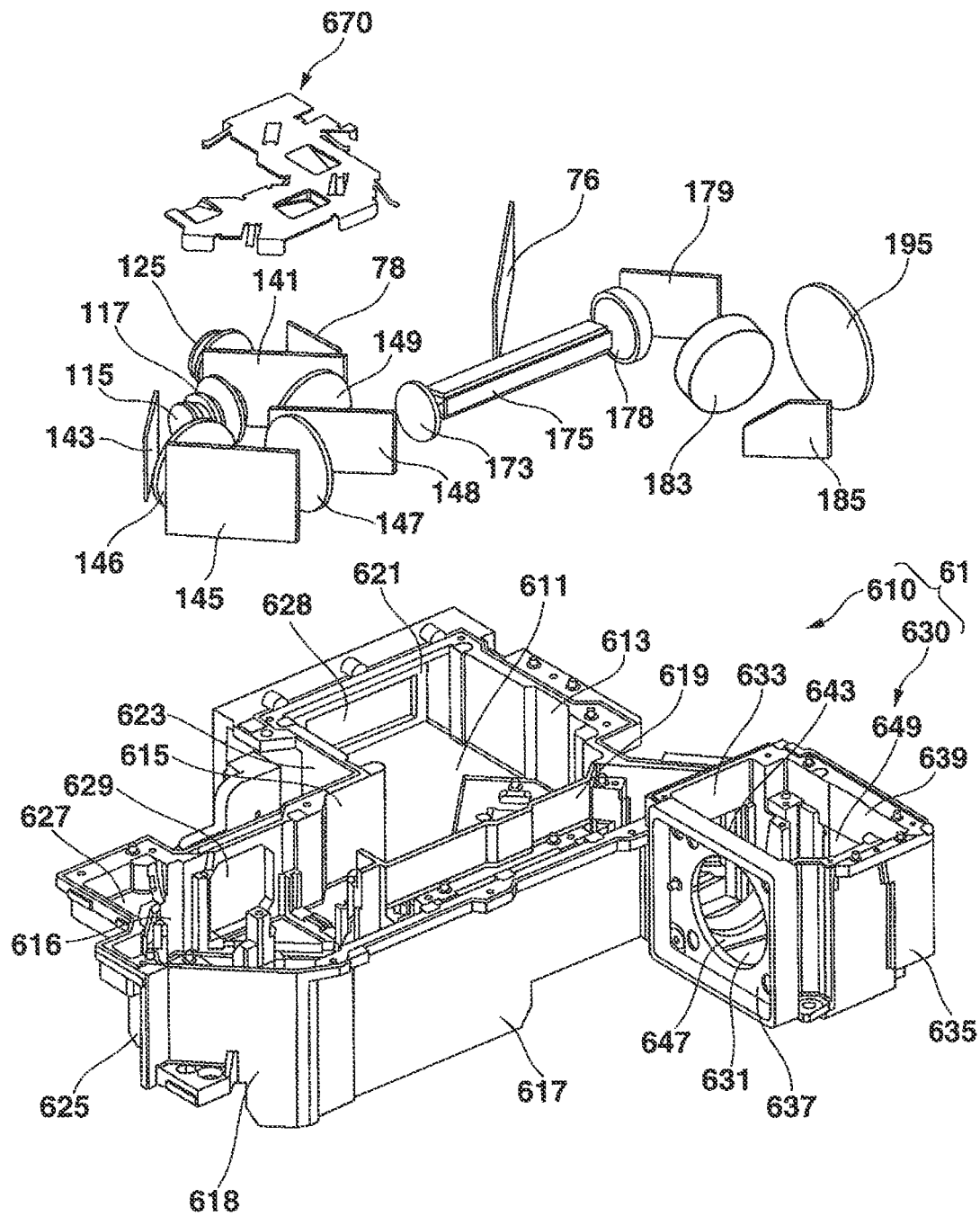
FIG. 5 is an exploded perspective view of a main part of the light source unit according to the embodiment of the invention.

Then, as shown in FIG. 5, the light source case 61 of the projector 10 includes mainly a substantially L-shaped main body portion 610 which accommodates therein the mirrors and lenses of the light guiding optical system and a display device accommodating portion 630 which accommodates therein the display device and the mirrors and lenses associated with the display device.

The main body portion 610 accommodates, as shown in FIG. 4, the reflecting mirror 76 and the diffuser plate 78 of the excitation light shining device 70, the first dichroic mirror 141, the collective lens 149, the second dichroic mirror 148, the first reflecting mirror 143, the collective lens 136, the second reflecting mirror 145, the collective lens 147 of the light guiding optical system, and the collective lens group 125 of the red light source device 120, the collective lens group 117 and the collective lens 115 of the green light source device 80, as well as the collective lens 173, the light tunnel 175, the collective lens 178 and the light axis changing mirror 179 of the light source side optical system 170.

The display device accommodating portion 630 accommodates, as shown in FIG. 4, the collective lens 183, the shining mirror 185 and the condenser lens 195 of the light source side optical system 170 in addition to the display device 51. Thus, many optical members are accommodated and fixed in place within the light source case 61.

Then, the light source case 61 is a diecast metallic product or a precision injection molded product of a heat resisting plastic material and includes an upper fastening plate 670 of a thin sheet of metal to fix the plurality of optical members accommodated therein in predetermined positions.

Then, the main body portion 610 of the light source case 61 has an L-shaped, plate-like main body bottom plate 611 and also has a rear side wall plate 613 which is provided to rise along a short transverse outer edge of the L-shaped main body bottom plate 611, a projecting lateral side wall plate 621 which is provided to rise along a short transverse end edge portion of the L-shaped main body bottom plate 611, a projecting front side wall plate 623 which is provided to rise along a short transverse front inner edge of the L-shaped main body bottom plate 611, a right side wall plate 615 which is provided to rise along a long longitudinal side edge of the L-shaped main body bottom plate 611, and a left side wall plate 617 which is provided to rise along the other long longitudinal side edge of the L-shaped main body bottom plate 611. The main body portion 610 also has a central side wall plate 619 which is provided to rise along a long longitudinal axial direction of the L-shaped main body bottom plate 611.

An opening 628 is formed in the projecting lateral side wall plate 621. The blue laser diodes 71 are positioned in the opening 628 when the fixing holder 74 of the excitation light shining device 70 shown in FIG. 4 is fixed to the projecting lateral side wall plate 621, so that excitation light is shone in the direction of the reflecting mirror 76 which is accommodated in the light source case 61.

Further, an opening 629 is also formed substantially in the center of the right side wall plate 615, so that light in the red wavelength range which is emitted from the red light source device 120 which is attached to an outer surface of the right side wall plate 615 can be shone in the direction of the first dichroic mirror 141 via the collective lens group 125.

An inclined portion 616 is provided at a front portion of the right side wall plate 615, and an inclined portion 618 is also provided at a front portion of the left side wall plate 617. Then, the inclined portion 616 of the right side wall plate 615 and the inclined portion 618 of the left side wall plate 617 are joined together by a joining wall plate 625.

A plate-like motor mounting plate 627 is provided so as to extend from an upper end of the inclined portion 616 of the right side wall plate 615 towards an outside of the light source case 61 in parallel to the main body bottom plate 611. This enables the motor 110 of the luminescent plate device 100 which makes up the green light source device 80 to be fixed to an upper surface of the light source case 61. Then, a wheel cover 111 can be placed thereover as shown in FIG. 3.

Then, the reflecting mirror 76 is accommodated to be disposed near a joining portion of the rear side wall plate 613 and a rear end of the central side wall plate 619, and the diffuser plate 78 is accommodated to be disposed between a position lying near a front end of the central side wall plate 619 and the right side wall plate 615. Then, the collective lens group 125, the first dichroic mirror 141, the collective lens group 117, the collective lens 115, the first reflecting mirror 143, the collective lens 146, the second reflecting mirror 145, the collective lens 147, the collective lens 149, and the second dichroic mirror 148 are accommodated to be disposed between a portion of the right side wall plate 615 which lies further forwards than the central side wall plate 619 and the left side wall plate 617. The collective lens 173, the light tunnel 175 and the collective lens 178 of the light source side optical system 170 are accommodated to be disposed between the central side wall plate 619 and the left side wall plate 617. The light axis changing mirror 179 is accommodated to be disposed behind the rear of the collective lens 178 near the rear side wall plate 613 (refer to FIG. 4).

The display device accommodating portion 630 is positioned at the rear of the left side wall plate 617 and at an outer rear end edge of the longitudinal side of the L-shaped main body bottom plate 611 and has a substantially rectangular parallelepiped shape. The display device accommodating portion 630 has a flat rectangular accommodating portion bottom plate 631, an accommodating portion rear side plate 639 which is provided to rise at a rear end edge of the accommodating portion bottom plate 631, an accommodating portion right side plate 633 which is provided to rise at a right side edge of the accommodating portion bottom plate 631, an accommodating portion left side plate 635 which is provided to rise at a left side end edge of the accommodating portion bottom plate 631 and an accommodating portion front side plate 637 which is provided to rise at a front end edge of the accommodating portion bottom plate 631.

In addition to the display device 51 shown in FIG. 4, the collective lens 183, the shining mirror 185 and the condenser lens 195 of the light source side optical system 170 are accommodated and fixed in place in the display device accommodating portion 630.

An opening 649 is formed in the accommodating portion rear side plate 639, and the display device 51 which is fixed to the heat sink 190 is positioned in this opening 649. An opening 643 is formed in the accommodating portion right side plate 633, and the light source light which is reflected on the light axis changing mirror 179 is guided into the display device accommodating portion 630. The image light formed by the display device 51 is emitted from the display device accommodating portion 630 so as to be incident on the projection side optical system 220.

As shown in FIG. 3, the light source case 61 has an upper cover plate 710. An upper side of the main body portion 610 and an upper side of the display device accommodating portion 630 are covered by the upper cover plate 710 so as to tightly seal up an interior of the light source case 61 to thereby prevent the intrusion of dust, whereby the contamination of the optical members by dust is prevented.

In accommodating and fixing the optical members such as the lenses and mirrors, the optical members are positioned on fixing portions which are formed on an inner surface of the light source case 61. Some of the optical members which are positioned on the fixing portions are pressed downwards from above by the upper fastening plate 670 so as to prevent the optical members from being dislocated from the fixing portions where they are fixed in place.

Figure 6:
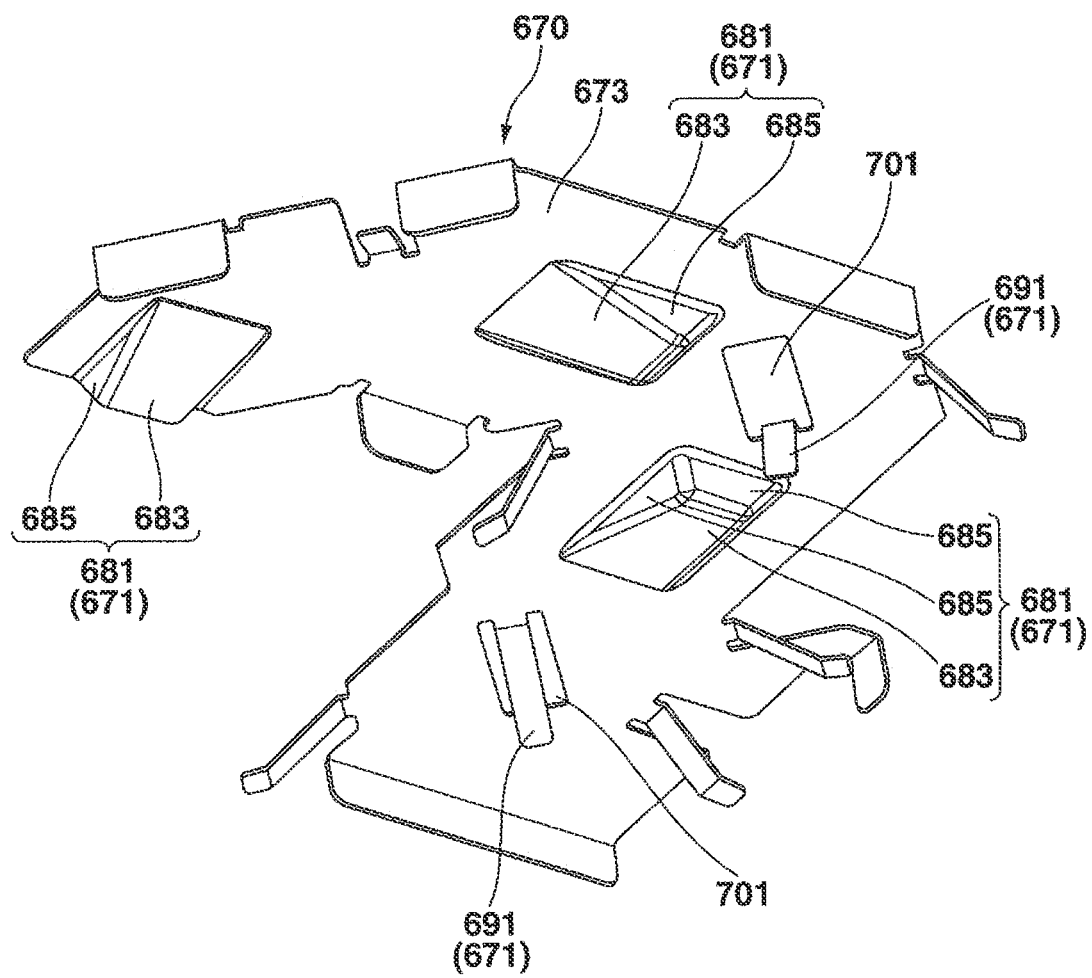
FIG. 6 is a bottom view of an upper fastening plate for use in the light source unit according to the embodiment of the invention.

On the upper fastening plate 670, as shown in FIG. 6, inclined projecting portions 681 which project downwards are formed as abutting portions 671 through pressing or drawing. The inclined projecting portions 681 each have an abutting inclined surface 683 having a rectangular planar shape and circumferential inclined surfaces 685. The circumferential inclined surfaces 685 which lie on both sides of the abutting inclined surface 683 have a substantially triangular shape, and the circumferential inclined surface 685 on one side of the abutting inclined surface 683 has a rectangular shape.

The upper fastening plate 670 shown in FIG. 6 has abutting tongue pieces 691 as abutting portions 671 which fasten the second dichroic mirror 148 and the collective lens 173 in addition to the inclined projecting portions 681 as the abutting portions 671 which fasten the collective lenses 146, 147, 149. The abutting tongue pieces 691 are formed by cutout holes 701, and the abutting tongue pieces 691 press down a predetermined number of optical members in the optical members which are fixedly accommodated in the light source case 61 from thereabove so as to fix them in place.

Figure 7:
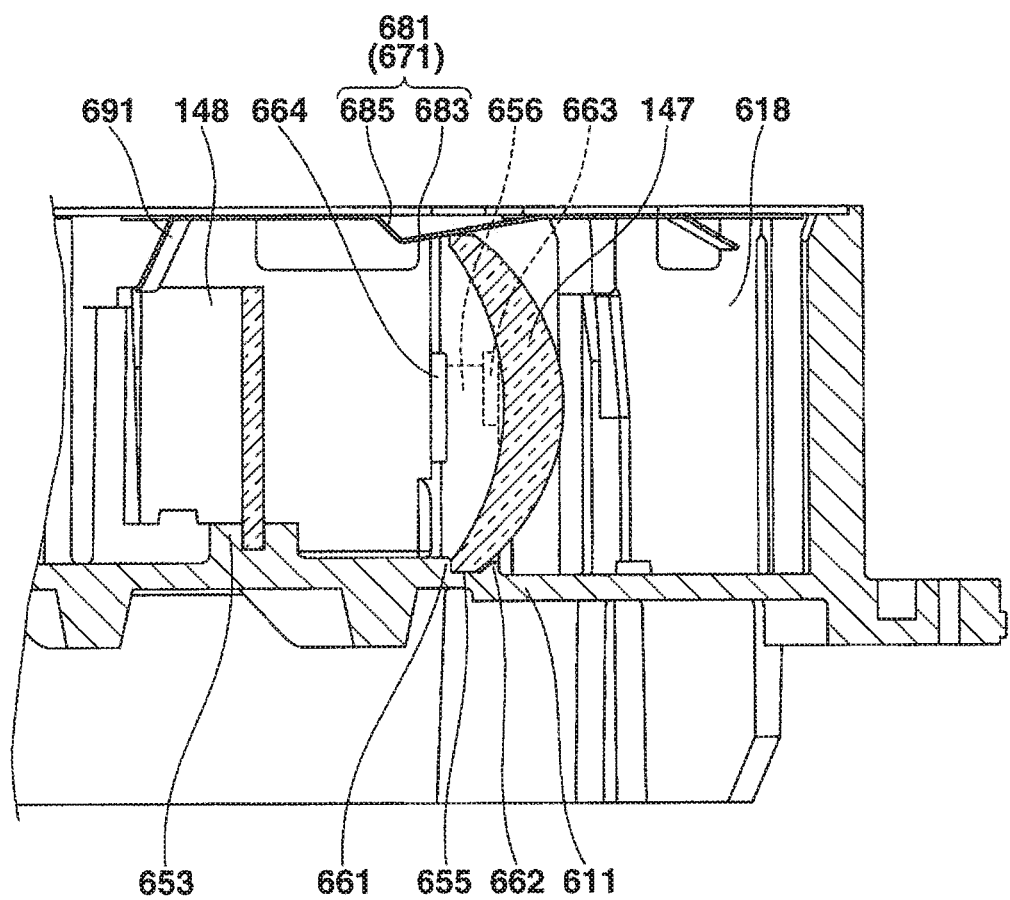
FIG. 7 is a schematic sectional view showing an example of a fixed state of an optical member in the light source unit according to the embodiment of the invention.

As shown in FIG. 7, the abutting inclined surface 683 is brought into abutment with an upper end of the collective lens 147 which is the optical member accommodated in the main body portion 610 of the light source case 61, and the abutting tongue piece 691 is brought into abutment with an upper end of the second dichroic mirror 148. By doing so, the optical members are prevented from being dislocated from the fixing portions formed on the main body portion 610 of the light source case 61 by the abutting inclined surfaces 683 of the inclined projecting portions 681 which function as the abutting portions 671 by making use of the elastic force of the upper fastening plate 670, that is, the elastic deformation force of the inclined projecting portions 683.

A configuration may be adopted in which rubber plates are securely affixed to the abutting inclined surfaces 683 so as to enhance the elastic deformation force of the inclined projecting portions 681 which function as the abutting portions 671.

Figure 8:
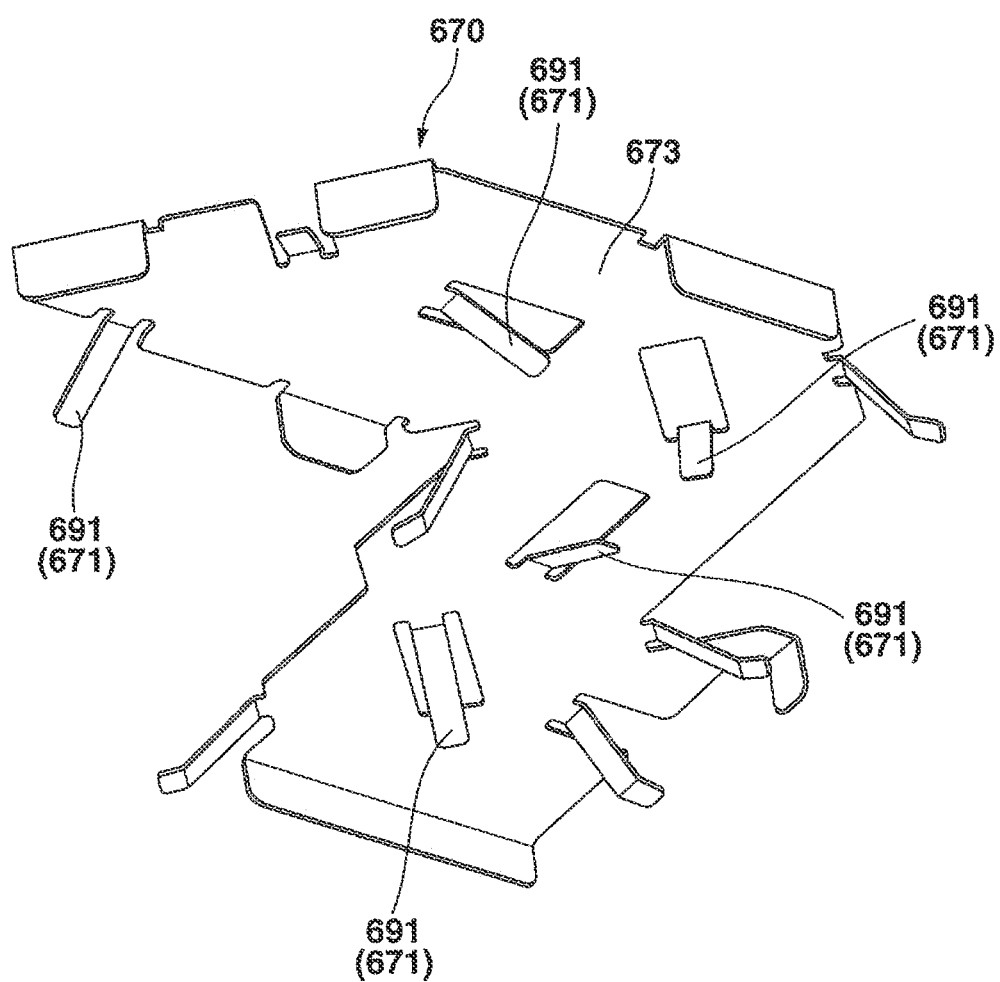
FIG. 8 is a bottom view of a modified upper fastening plate for use in the light source unit according to the embodiment of the invention.

Additionally, as shown in FIG. 8, a plurality of abutting tongue pieces 691 may be formed as abutting portions 671 in place of the inclined projecting portions 681, and a plurality of optical members may be fastened individually by the plurality of abutting tongue pieces 691.

In the optical members which are accommodated and fixed in place in the light source case 61, some optical members are fixed in a similar manner to the conventional one in which grooves are formed on the upper surface of the main body bottom plate 611 and the side surfaces of the side wall plates so that end edges of the optical members are inserted into the grooves to thereby be held therein, and the other optical members are accommodated and fixed in place in the light source case 61 by forming fixing portions so that the optical members are fixed to the fixing portions.

Figure 9:
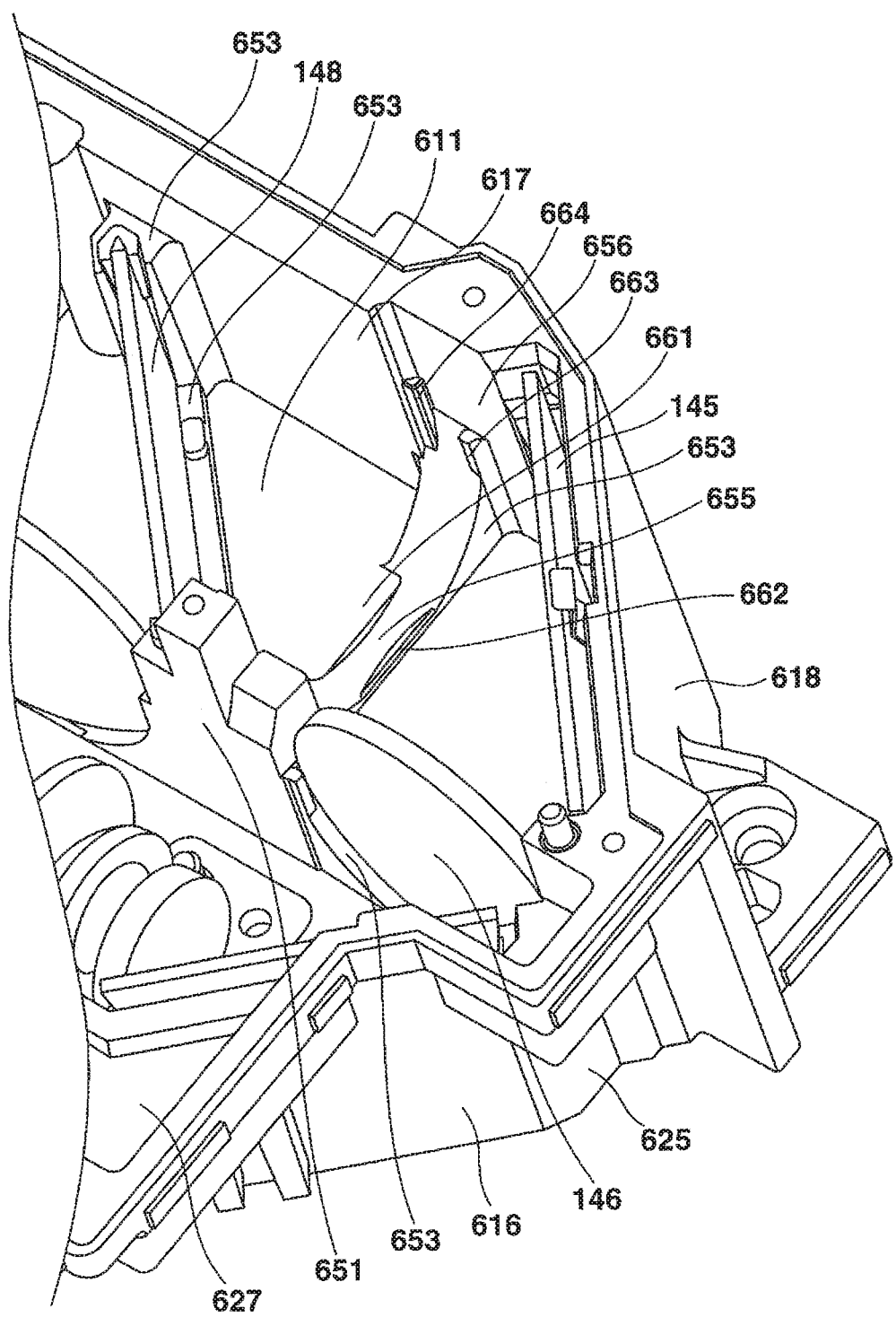
FIG. 9 is a perspective view showing an example of fixing portions of the optical member in the light source unit according to the embodiment of the invention.

As a fixing portion formed in the light source case 61, as shown in FIG. 9, a lower fixing portion 655 is provided in which a bearing portion 653 which matches an external circumferential shape of the optical member such as the lens or mirror is formed on the main body bottom plate 611 or the inner side of the side wall plate and a depression which matches the external circumferential shape of the optical member is formed on the main body bottom plate 611 so as to support a lower end of the optical member. Further, side fixing portions 656 which can support left and right end portions of the optical member are provided on the side wall plates of the light source case 61.

In the event that the optical member is disposed in a position which is spaced away from the left and right side wall plates 615, 617 or the central side wall plate 619, a fixing portion may be formed by providing a bearing support column 651 so as to rise from the main body bottom plate 611 as required and providing a bearing portion 653 on a side surface of the bearing support column 651 or the upper surface of the main body bottom plate 611.

The fixing portion is formed by the lower fixing portion 655 and the side fixing portions 656. When supporting the optical member having the rectangular external shape such as the mirror, the lower fixing portion 655 is formed directly on the upper surface of the main body bottom plate 611 or on an upper surface of a bearing portion 653 which is provided on the main body bottom plate 611. The side fixing portions 656 are each formed directly on the side wall plate or the bearing support column 651 or on an inner surface of a bearing portion 653 which is supported on the side wall plate or the bearing support column 651.

When fixing the optical member having the circular external shape such as the lens, the lower fixing portion 655 is formed directly on the upper surface of the main body bottom plate 611 or on an upper surface of a bearing portion 653 which is provided on the main body bottom plate 611. Then, a bearing portion 653 is formed along a circumferential edge of the optical member so as to support a lower half portion of the optical member. Then, the side fixing portions 656 are formed on an upper surface of the bearing portion 653 and directly on the side wall plate or the bearing support column 651 or on an inner surface of the bearing portion 653 which is supported on the side wall plate or the bearing support column 651. Thus, the fixing portion is formed in which the side fixing portions 656 continue smoothly from the lower fixing portion 655.

In place of the configuration described above, there may be adopted a configuration in which with the bearing portions 653 omitted, a lower fixing portion 655 which is a depression matching a lower end shape of the optical member is formed on the main body bottom plate 611 to support a lower end of the optical member, and side fixing portions 656 are formed by adjusting a space between the side wall plates or between a surface of the side wall plate and a side surface of the bearing support column 651 so as to match the optical member.

The lower fixing portion 655 is formed so that a height of a surface thereof matches a height-wise position of the optical member when the optical member is disposed in the light source case 61.

A projecting body which is brought into abutment with one side surface of the optical member at the lower end of the optical member is provided on the lower fixing portion 655 as a primary positioning portion 661. Projecting bodies are also provided on the side fixing portions 656 as secondary positioning portions 663 which are brought into contact with a surface of the optical member which is opposite to the surface with which the primary positioning portion 661 is brought into contact at a side end edge of the optical member.

The projecting bodies which constitute the secondary positioning portions 663 are provided individually on the corresponding side fixing portions 656 as a pair of projecting bodies which are provided at left and right end portions of the optical member in a symmetrical fashion in such a manner that the projecting bodies are brought into contact with a surface of an end edge of the optical member at both the left and right end portions of the optical member.

A projecting body which is an auxiliary positioning portion 662 is provided on the main body bottom plate 611 in a position which defines a space which is slightly wider than a thickness of the end portion of the optical member between the projecting member which constitutes the primary positioning portion 661 and itself. Projecting bodies which are secondary auxiliary positioning portions 664 are provided on the side wall plates or the bearing support columns 651 in a position which defines a space which is slightly wider than the thickness of the end portion of the optical member between the secondary positioning portions 663 and themselves.

Consequently, as shown in FIG. 7, in the case of the optical member being a convex meniscus lens, the lens as the optical member can be fixed by bringing a flat side surface at a lower end of the lens into abutment with the primary positioning portion 661 and bringing the secondary positioning portions 663 into abutment with circumferential edge portions of a convexly curved surface of the lens at a middle height of the lens so that the lower end of the optical member is prevented from being dislocated from the lower fixing portion 655 by the auxiliary positioning portion 662 and the middle height portions of the optical member are prevented from being dislocated from the side fixing portions 656 by the secondary auxiliary positioning portions 664.

In case the flat surface positions which are contact surfaces of the projecting bodies which are the primary positioning portion 661 and the secondary positioning portions 663 with the optical member are properly positioned and oriented in the proper directions through precision injection molding such as die casting, the optical members can be positioned accurately to be fixed in place accordingly within the light source case 61.

The contact surface of the primary positioning portion 661 and the contact surfaces of the secondary positioning portions 663 are minute planar surfaces, and therefore, in fabricating them, the contact surfaces can easily be formed as parallel surfaces which are parallel to each other and which define a space which is equal to the thickness of the end portion of the optical member in the direction of the planar surfaces and as planar surfaces which are normal to the optical axis of the optical member or the planar surface of the main body bottom plate 611.

In supporting and fixing the optical member at three points by the primary position portion 661 and the secondary positioning portions 663, the abutting portion 671 which is situated above the fixing portions forms the inclined projecting portion 681 in which the abutting inclined surface 683 of the abutting portion 671 lowers in height as it extends towards the side surface of the fixing portion from which the primary positioning portion 661 is caused to project.

Owing to this, the upper end of the optical member is pressed downwards by the abutting inclined surface 683 of the inclined projecting portion 681 which is so inclined. In addition, a pressing force is also applied in the direction of the surface of the optical member which is brought into contact with the secondary positioning portions 663, whereby both the left and right end portions of the optical member can be brought into press contact with the secondary positioning portions 663 in the middle height positions of the optical member in an ensured fashion.

Thus, both the left and right end portions of the optical member are brought into press contact with the secondary positioning portions 663 at the middle height positions thereof in an ensured fashion, and the force acting in the direction of the primary positioning portion 661 is applied to the lower end portion of the optical member, whereby the optical member is brought into press contact with a distal end of the primary positioning portion 661 in an ensured fashion.

Not only when the inclined projecting portion 681 is used as the abutting portion 671 but also when the abutting tongue piece 691 is used as the abutting portion 671, the optical member can similarly be brought into press contact with the primary positioning portion 661 and the secondary positioning portions 663 by aligning a free end side of the abutting tongue piece 691 with the direction of a side surface of the fixing portion provided at the primary positioning portion 661 and lowering a primary positioning portion 661 side of the abutting tongue portion 691 which is the abutting portion 671 above the fixing portion.

Figure 10:
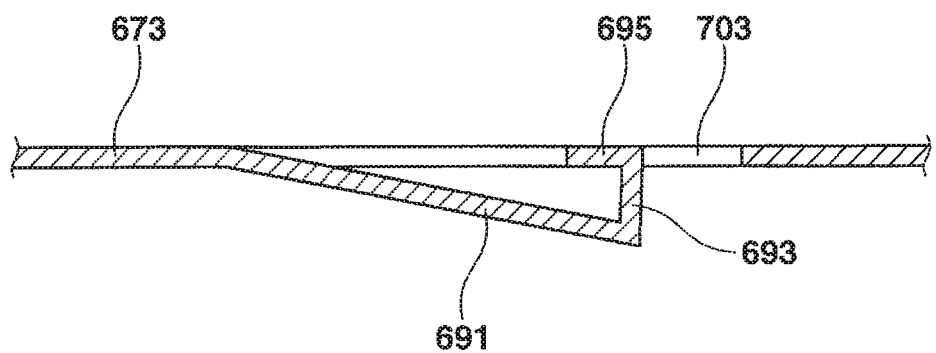
FIG. 10 is a sectional view showing a modified abutment portion on the upper fastening plate for use in the light source unit according to the embodiment of the invention.

Then, when the abutting tongue piece 691 is used as the abutting portion 671, in the event that the elastic force of the abutting tongue piece 691 becomes insufficient due to the thickness of a material of a metallic plate which makes up the upper fastening plate 670, there may be adopted a configuration as shown in FIG. 10 in which the free end side of the abutting tongue piece 691 is bent into a U shape to form a bent-back support portion 693 which rises upwards from a distal end of a free end of the abutting tongue piece 691 and a support surface portion 695 is formed at an upper end of the bent-back support portion 693 so formed.

When the bent-back support portion 693 and the support surface portion are formed, the support surface portion 695 is brought into abutment with a lower surface of the upper cover plate 710 of the light source case 61, whereby the free end side of the abutting tongue piece 691 is prevented from deflecting upwards when an external force is applied to the abutting tongue piece 691 from therebelow, thereby making it possible to enhance the elastic force thereof.

It is also possible to bring an upper end of the bent-back support portion 693 into abutment with the lower surface of the upper cover plate 710 without forming the support surface portion 695.

Figure 11:
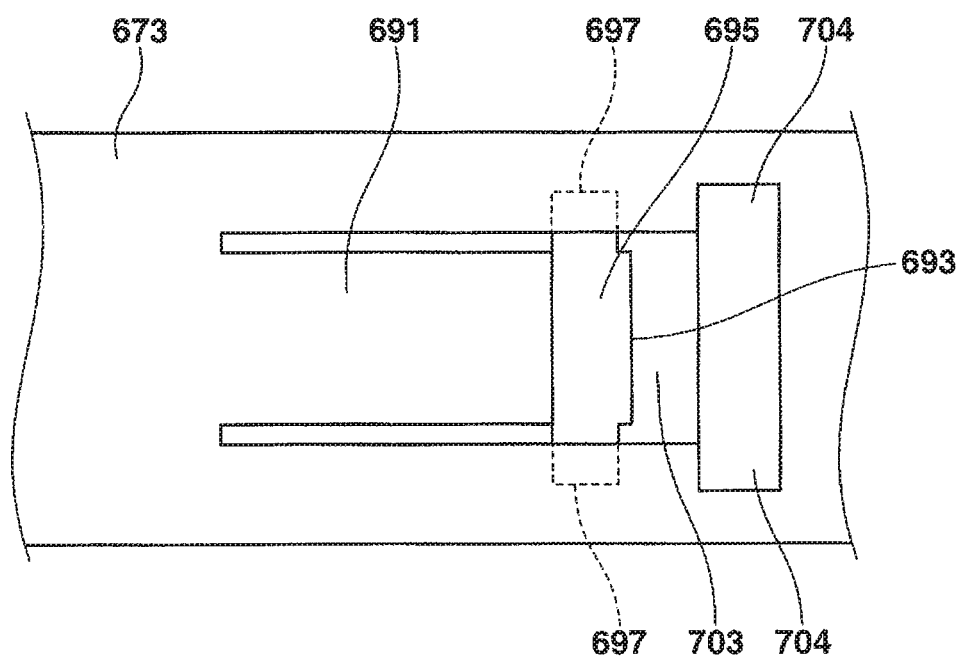
FIG. 11 is a schematic plan view showing another modified abutment portion on the upper fastening plate for use in the light source unit according to the embodiment of the invention.
Figure 12:
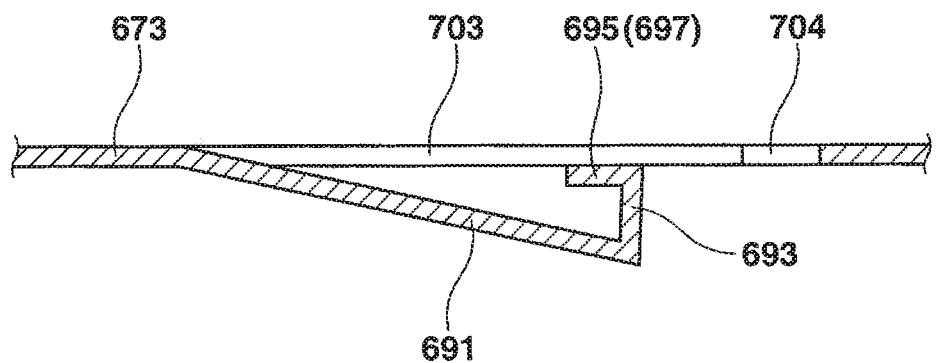
FIG. 12 is a sectional view showing a section of the above modified abutment portion of the upper fastening plate for use in the light source unit according to the embodiment of the invention.

In addition, as shown in FIGS. 11 and 12, in forming an abutting tongue piece 691 by providing a cutout hole 701 in a fastening plate main body 673, the following process may also be taken. The cutout hole 701 is not formed into a U shape but formed into an expanded cutout portion 704 by forming a portion defined by two parallel lines of a U shape as a main cutout portion 703 and causing a portion which constitutes a bottom side of the U shape to project to be wider than the main cutout portion 703 defined by the two lines at both ends thereof, whereby a T-shaped abutting tongue piece 691 is provided. Then, expanded support surfaces 697 which are formed by the expanded cutout portion 704 are provided at both ends of a support surface portion 695, and the expanded support surfaces 697 are brought into abutment with a lower surface of the fastening plate main body 673 to thereby enhance the elastic force of the abutting tongue piece 691.

In this way, according to this embodiment of the invention, the light source case 61 which accommodates therein the plurality of optical members is formed through precision injection molding such as die casting, and the primary positioning portion 661 and the secondary positioning portions 663 are provided on the fixing portions where the optical members are accommodated to be disposed in the light source case 61. Therefore, the contact surfaces of the positioning portions with the optical member can easily be formed properly in the predetermined positions, and the optical member is fixed at the three points by the primary positioning portion 661 and the pair of second positioning portions 663. Thus, the optical member can be fixed accurately in the appropriate positions within the light source case 61.

Owing to this, light transmitted through the optical member or light reflected by the optical member can be emitted in the predetermined direction or over the predetermined range. This can enhance the accuracy of the optical system to thereby reduce waste light which leaks out of the optical path of the optical member, whereby not only can the bright light source unit 60 be provided, but also the projector 10 can be provided which can project a bright and clear image.

In addition, the areas of the contact surfaces which are brought into contact with the optical member can be reduced by forming the positioning portions such as the primary positioning portion 661 and the secondary positioning portions 663 which are formed on the fixing portions as the projecting bodies, whereby the positioning portions can be formed in the predetermined positions and at predetermined angles easily and accurately. Thus, the optical member can be fixed easily in the accurate position by the minute surfaces which are normal to the optical axis of the optical member.

Further, the primary positioning portion 661 is formed as the single projecting body, and the secondary positioning portions 663 are formed as the pair of projecting bodies which are laterally symmetrical with each other. This enables the optical member to be supported at one point at the lower end of the optical member and at two points in the middle height positions of the optical member, whereby the optical member can be supported and fixed in place in a stable state as a result of the optical member being supported at the three points.

Then, by providing the upper fastening plate 670 which presses down some of the optical members which are accommodated in the light source case, a plurality of optical members which are fixed to the fixing portions and positioned by the positioning portions can be accommodated and fixed in place within the light source case 61 by the upper fastening plate 670, and this can facilitate the assemblage of the light source unit 60.

Furthermore, by providing the abutting portions 671 which are situated above the fixing portions on the upper fastening plate 670, the optical member can be fixed to the fixing portions in a safe and ensured fashion by the abutting portions 671.

In addition, the inclined projecting portion 681 having the abutting inclined surface 683 or the abutting piece 691 is used as the abutting portion 671, and the abutting portion 671 is inclined so that the side of the abutting portion 671 which faces the primary positioning portion 661 is positioned lower than the side thereof which faces the secondary positioning portions 663. Then, in the event that the optical member is fastened or pressed down by the abutting portion 671 so formed, not only can the optical member be pressed against the lower fixing portion by means of the elastic force of the inclined projecting portion 681 or the abutting tongue piece 691, but also the pressing force can be applied to the upper end of the optical member so as to incline the optical member towards the secondary positioning portions 663 together with the downward pressing force. Thus, the optical member can be brought into contact with the secondary positioning portions 663 in an ensured fashion, and the lower end of the optical member can be brought into abutment with the primary positioning portion 661 in an ensured fashion.

The embodiment that has been described heretofore is presented as the example, and there is no intention at all to limit the scope of the invention by those embodiments. The novel embodiment can be carried out in other various forms, and hence, various omissions, replacements, alterations and modifications can be made thereto without departing from the spirit and scope of the invention. The resulting embodiments and their modifications are not only included in the spirit and scope of the invention but also included in the scope of inventions claimed under claims and their equivalents.

What is claimed is:

1. A light source unit comprising:
a light source case into which a plurality of optical members are incorporated, wherein
the light source case has:
fixing portions for fixing the optical member which are provided in a position on a main body bottom plate of the light source case and in both side positions of the optical member above the main body bottom plate; and
an upper fastening plate including abutting portions which are disposed above the fixing portions and press down the optical member which is accommodated in the light source case, wherein
the fixing portions include a lower fixing portion where a primary positioning portion is formed on the main body bottom plate and side fixing portions where a pair of secondary positioning portions are formed, the pair of secondary positioning portions being brought into abutment with a surface of the optical member which is opposite to a surface thereof which is brought into abutment with the primary positioning portion, and wherein
the abutting portions are each formed into an inclined projecting portion having an abutting inclined surface, and the abutting inclined surface is inclined above the fixing portions so that a side of the abutting inclined surface which faces the primary positioning portion is lower than a side thereof which faces the secondary positioning portions.

2. The light source unit according to claim 1, wherein
the light source case is formed through precision injection molding, and wherein
the positioning portions are formed as projecting bodies, and contact surfaces of the projecting bodies where the projecting bodies are brought into contact with the optical member are normal to an optical axis of the optical member.

3. The light source unit according to claim 2, wherein
the projecting body which makes up the primary positioning portion is formed one on the fixing portion, and the projecting bodies which make up the secondary positioning portions are formed on the left and right of the optical member in a symmetrical fashion.

4. The light source unit according to claim 1, wherein
the upper fastening plate presses down some of the plurality of optical members.

5. A projector comprising:
the light source unit according to claim 1;
a display device which generates image light;
a projection side optical system which projects the image light emitted from the display device on to a screen; and
a projector control unit which controls the light source unit and the display device.

6. A light source unit comprising:
a light source case into which a plurality of optical members are incorporated, wherein
the light source case has:
fixing portions for fixing the optical member which are provided in a position on a main body bottom plate of the light source case and in both side positions of the optical member above the main body bottom plate; and
an upper fastening plate including abutting portions which are disposed above the fixing portions and press down the optical member which is accommodated in the light source case, wherein
the fixing portions include a lower fixing portion where a primary positioning portion is formed on the main body bottom plate and side fixing portions where a pair of secondary positioning portions are formed, the pair of secondary positioning portions being brought into abutment with a surface of the optical member which is opposite to a surface thereof which is brought into abutment with the primary positioning portion, and wherein
the abutting portions are each formed into an abutting tongue piece having a tongue shape, and the abutting tongue piece is inclined above the fixing portions so that a side of the abutting tongue piece which faces the primary positioning portion is lower than a side thereof which faces the secondary positioning portions.

7. The light source unit according to claim 6, wherein
the light source case is formed through precision injection molding, and wherein
the positioning portions are formed as projecting bodies, and contact surfaces of the projecting bodies where the projecting bodies are bought into contact with the optical member are normal to an optical axis of the optical member.

8. The light source unit according to claim 7, wherein
the projecting body which makes up the primary positioning portion is formed one on the fixing portion, and the projecting bodies which make up the secondary positioning portions are formed on the left and right of the optical member in a symmetrical fashion.

9. The light source unit according to claim 6, wherein
the upper fastening plate presses down some of the plurality of optical members.

10. A projector comprising:
the light source unit according to claim 6;
a display device which generates image light;
a projection side optical system which projects the image light emitted from the display device on to a screen; and
a projector control unit which controls the light source unit and the display device.

* * * * *